(No Model.)

W. H. PATTON.
MOTOR FOR STREET CARS.

No. 409,116. Patented Aug. 13, 1889.

Witnesses
W. Rossiter
Albert H. Adams

Inventor
William H. Patton

UNITED STATES PATENT OFFICE.

WILLIAM H. PATTON, OF ENGLEWOOD, ILLINOIS, ASSIGNOR TO THE PATTON MOTOR COMPANY, OF PUEBLO, COLORADO.

MOTOR FOR STREET-CARS.

SPECIFICATION forming part of Letters Patent No. 409,116, dated August 13, 1889.

Application filed February 25, 1889. Serial No. 301,004. (No model.)

*To all whom it may concern:*

Be it known that I, WILLIAM H. PATTON, residing at Englewood, in the county of Cook and State of Illinois, and a citizen of the United States, have invented a new and useful Improvement in Motors for Street-Cars, of which the following is a specification, reference being had to the accompanying drawings, in which—

Figure 1:
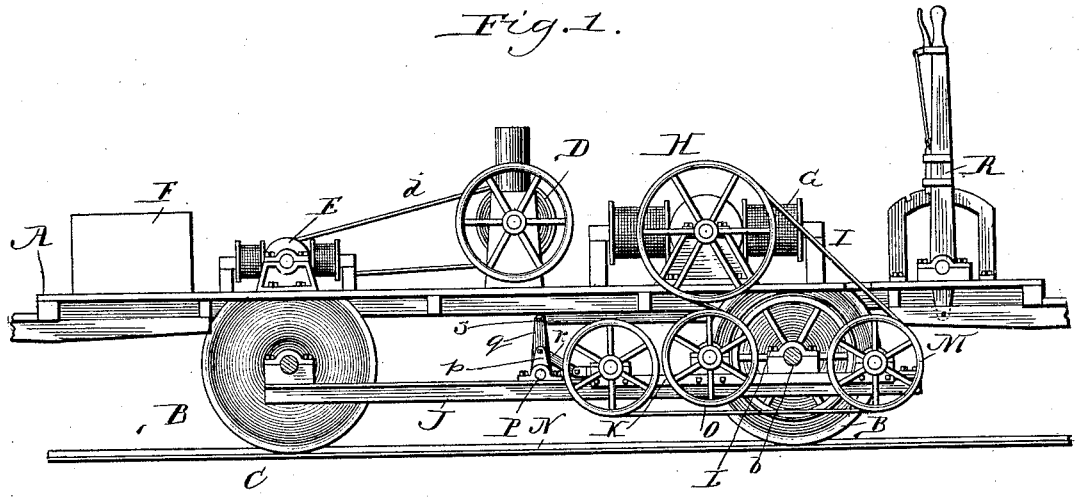
Figure 2:
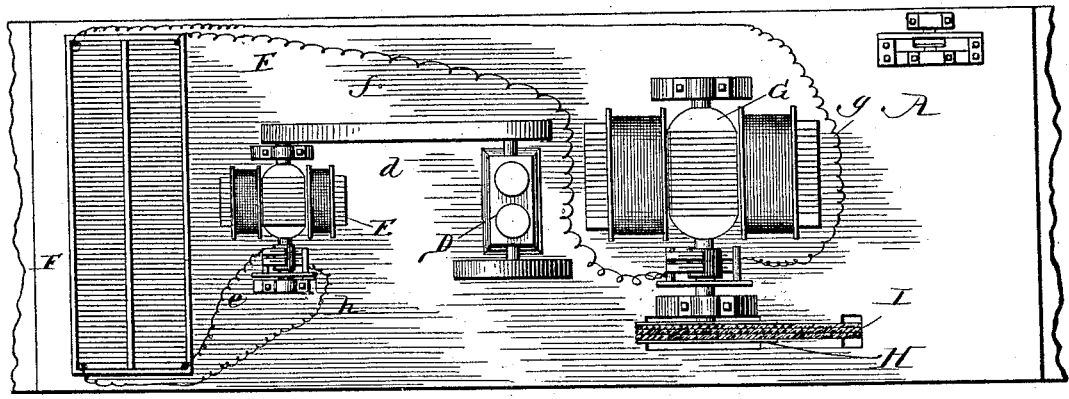

Figure 1 is a side elevation, some parts being in section. Fig. 2 is a top or plan view.

This invention relates to motors for street-cars of the class shown and described in my patent, No. 374,081, dated November 29, 1887.

The object of this invention is to provide an improved driving-power for motors of this class, which will enable the gas-engine or other motive power to be run continuously and at a high rate of speed in relation to the speed of the cars, for driving a dynamo, which I accomplish as illustrated in the drawings, and hereinafter described.

That which I claim as new will be pointed out in the claim.

In the drawings, A indicates the car, which is mounted upon wheels B, which run upon the track C.

D is a gas-engine or other motive power.

E is a dynamo, which is driven by a belt $d$ from the gas-engine D.

F is a storage-battery, one side of which is connected with the dynamo by the conductor $e$.

G is an electric motor, which is connected with one side of the storage-battery F by the conductor $f$, and with the opposite side of the storage-battery by the conductor $g$. This side of the storage-battery F is also connected with the dynamo E by a conductor $h$.

H is the driving pulley or wheel of the electric motor G which drives the gearing by the band or cable I.

J is a frame suspended from the axles of the wheels B.

K is a sliding or movable frame supported on the suspended frame J.

L is a pulley or wheel mounted on the axle $b$ of the wheels B.

M is a band wheel or pulley mounted on an axle $m$ supported on the movable frame K.

N is an idler-wheel mounted on an axle supported on the frame K.

O is a second band wheel or pulley mounted on an axle $o$, supported on the frame K on the opposite side of the axle $b$ from the wheel M and axle $m$.

The band or cable I runs over the driving-pulley H, wheel or pulley M, idler wheel or pulley N, and wheel or pulley O, driving the wheels or pulleys M and O in opposite directions.

P is a rock-shaft, which is mounted in bearings on the frame J, and is provided with two arms $p$ and $q$. The arm $p$ is connected with the movable frame K by a link $r$, and the arm $q$ is connected with a lever R by means of a bar or link $s$. The lever R is supported in bearings on the car-floor, and is provided with the usual pawl and rack for holding the lever R in the desired position.

In use the gas-engine or other motive power drives the dynamo which generates electricity supplied to the storage-battery and electric motor by means of the conductors $e$, $f$, $g$, and $h$. The electric motor G, through the wheel H and band or cable I, drives the wheels M and O and their axles, as described hereinbefore, and as more particularly set forth in my said former patent.

The friction-wheels on the axles $m$ and $o$ drive the wheel L, and are thrown into and out of engagement therewith by means of the lever R and rock-shaft P, having levers or arms $p$ $q$ and connecting link-rods.

The gas-engine, dynamo, storage-battery, and electric motor may be arranged on the car, as shown, or in any other suitable arrangement. By using a dynamo, storage-battery, and electric motor in connection with the gas-engine or other motive power the gas-engine or motive power may be run at a high speed and continuously. The dynamo can be run at a high speed by the gas-engine or motive power, and the electricity generated can be used by the motor as required, so that the speed of the gas-engine or other motive power can be regulated to suit its requirement without regard to the speed required for the driving-gear of the car, and the gas-engine or motive power can also run continuously without any loss of power in stopping and starting, as the electricity generated by the dynamo while the car is not moving and all electricity in excess of that required to run the electric motor when the car is moving is stored in the storage-battery F.

By using a dynamo and electric motor the gearing of the car is driven at any desired speed without regard to the speed of the engine or motive power, and by using a storage-battery in connection with the dynamo and electric motor the electricity in excess of that used by the motor is stored, thus not only preventing a waste of power in starting and stopping the engine or motive power, but providing a powerful current of electricity to be used when the car is started, as is necessary, from the fact that more power is required to start a car or train than is required after the train is in motion. An operative motor may be had by connecting the dynamo directly with the electric motor, but it will not be as steady or as efficient as when combined with a storage-battery.

What I claim as new, and desire to secure by Letters Patent, is—

The combination, with the engine or motive power of a motor-car for street-cars, of a dynamo E, a storage-battery F, an electric motor G, conductors $e$, $f$, $g$, and $h$, and a gearing, substantially as set forth, for driving the wheels of a car from the electric motor, substantially as and for the purpose set forth.

WILLIAM H. PATTON.

Witnesses:
HARRY T. JONES,
ALBERT H. ADAMS.